United States Patent
Steinlechner

(10) Patent No.: US 9,348,017 B2
(45) Date of Patent: May 24, 2016

(54) METHOD AND DEVICE FOR ASCERTAINING A MISALIGNMENT OF A RADAR SENSOR OF A VEHICLE

(71) Applicant: Siegbert Steinlechner, Leonberg (DE)
(72) Inventor: Siegbert Steinlechner, Leonberg (DE)
(73) Assignee: ROBERT BOSCH GMBH, Stuttgart (DE)
( * ) Notice: Subject to any disclaimer, the term of this patent is extended or adjusted under 35 U.S.C. 154(b) by 198 days.
(21) Appl. No.: 14/283,416
(22) Filed: May 21, 2014
(65) Prior Publication Data
US 2014/0347206 A1    Nov. 27, 2014
(30) Foreign Application Priority Data

May 22, 2013    (DE) .......................... 10 2013 209 494

(51) Int. Cl.
*G01S 7/40* (2006.01)
*G01S 13/93* (2006.01)
(52) U.S. Cl.
CPC ................. *G01S 7/40* (2013.01); *G01S 7/4026* (2013.01); *G01S 13/931* (2013.01); *G01S 2007/403* (2013.01); *G01S 2007/4086* (2013.01)
(58) Field of Classification Search
CPC ....... G01S 7/40; G01S 7/4026; G01S 13/931; G01S 2007/4086; G01S 2007/403; G01S 2007/4034; G01S 2013/9375; H01Q 1/3233; H01Q 3/267; G01B 11/27
USPC .................. 342/5, 173, 174, 70–72, 140–141
See application file for complete search history.

(56) References Cited

U.S. PATENT DOCUMENTS

| | | | | |
|---|---|---|---|---|
| 6,356,229 B1 * | 3/2002 | Schneider | ............. | G01S 7/4026 342/195 |
| 6,636,172 B1 * | 10/2003 | Prestl | ..................... | G01S 7/4026 342/173 |
| 2002/0105456 A1 * | 8/2002 | Isaji | ...................... | G01S 7/4026 342/165 |
| 2003/0090411 A1 * | 5/2003 | Haney | ................... | G01S 7/4026 342/165 |
| 2005/0116854 A1 * | 6/2005 | Beez | ..................... | G01S 7/4026 342/70 |
| 2006/0176214 A1 * | 8/2006 | Nakagawa | ............ | G01S 7/4026 342/174 |
| 2008/0012752 A1 * | 1/2008 | Okamura | .............. | G01S 7/4026 342/165 |
| 2008/0224918 A1 * | 9/2008 | Shimizu | ................ | G01S 7/4026 342/147 |
| 2011/0074620 A1 * | 3/2011 | Wintermantel | ......... | G01S 7/032 342/70 |
| 2012/0293360 A1 * | 11/2012 | Hasegawa | ............... | G01S 13/34 342/146 |
| 2013/0088382 A1 * | 4/2013 | Lee | ........................ | G01S 7/4004 342/174 |
| 2014/0152490 A1 * | 6/2014 | Lehning | .................. | G01S 13/92 342/169 |
| 2014/0347206 A1 * | 11/2014 | Steinlechner | ......... | G01S 7/4026 342/5 |

FOREIGN PATENT DOCUMENTS

| | | | | |
|---|---|---|---|---|
| DE | 19707591 C1 * | 10/1998 | ............ | G01S 7/2813 |
| DE | 102007001367 | 7/2008 | | |
| DE | EP 2113787 A1 * | 11/2009 | ............ | G01S 7/4026 |
| DE | 102009027523 A1 * | 1/2011 | ............ | G01S 7/4026 |
| FR | EP 1260832 A1 * | 11/2002 | ............ | G01B 11/27 |

* cited by examiner

*Primary Examiner* — John B Sotomayor
(74) *Attorney, Agent, or Firm* — Norton Rose Fulbright US LLP

(57) ABSTRACT

A method for ascertaining a misalignment of a radar sensor of a vehicle ascertains a misalignment angle of the misalignment using a weighted averaging of calculated differences between first and second angles of radar reflectors relative to various axes. Also described is a device for ascertaining this misalignment.

10 Claims, 7 Drawing Sheets

METHOD AND DEVICE FOR ASCERTAINING A MISALIGNMENT OF A RADAR SENSOR OF A VEHICLE

FIELD OF THE INVENTION

The present invention relates to a method and a device for ascertaining a misalignment of a radar sensor of a vehicle.

BACKGROUND INFORMATION

In modern vehicle systems radar systems are sometimes used which are able to simultaneously measure the distance, speed and direction of objects, for example, of preceding vehicles. Such radar systems having appropriate radar sensors may be employed in adaptive cruise control systems (ACC). Here, the correct alignment of the radar sensor to the longitudinal axis of the vehicle is of central importance.

In the case of minor accidents or other external influences, the radar sensor may become misaligned, which may result in reduced efficiency of the ACC. Traditionally, such a misalignment is carried out at a misalignment angle on special measuring sections in which provided radar reflectors should be precisely positioned both in relation to the vehicle as well as to one another.

A measuring section is known from German Published Patent Appln. No. 10 2007 001 367, which includes a straight aligned roadway and a line pole at one end of the roadway or line poles situated on a shoulder delimiting the roadway. In the corresponding method the positions of the line pole are ascertained and compared to setpoint data stored in a memory based on the known orientation of the measuring section.

SUMMARY

The present invention provides a method for ascertaining a misalignment of a radar sensor of a vehicle and a corresponding device.

The method according to the present invention includes the steps of:

measuring distances between the radar sensor and each individual radar reflector of a first plurality of radar reflectors spaced apart from each other at each individual measuring point of a second plurality of measuring points spaced apart from each other;

measuring first angles between an axis of the radar sensor, along which a radar emission takes place, and the radar reflectors at each measuring point;

creating a virtual map on the basis of the measured distances including measuring positions which correspond to positions of the measuring points and radar reflector positions which correspond to positions of the radar reflectors;

calculating second angles between the radar reflector positions and reference axes defined on the virtual map which correspond essentially to a vehicle longitudinal axis of the vehicle, at the measuring positions;

calculating the differences between angles of the first angles and angles of the second angles to which the former respectively correspond;

ascertaining a misalignment angle of the misalignment by a weighted averaging of the calculated differences.

The device according to the present invention includes: a radar sensor which is designed to measure distances between the radar sensor and a first plurality of radar reflectors spaced apart from each other at each individual measuring point of a second plurality of measuring points spaced apart from each other; and to measure first angles between an axis of the radar sensor, along which a radar emission takes place, and the radar reflectors at each individual measuring point; and a processor unit which is designed to create a virtual map on the basis of the measured distances, which includes measuring positions which correspond to positions of the measuring points, and radar reflector positions which correspond to positions of the radar reflectors; to calculate at the measuring points second angles from the virtual map between the radar reflector positions and reference axes defined on the virtual map which correspond essentially to a vehicle longitudinal axis of the vehicle; to calculate differences between angles of the first angles and angles of the second angles to which the former respectively correspond; and to ascertain a misalignment angle of the misalignment by a weighted averaging of the calculated differences.

The method according to the present invention requires no special measuring section in which the positions of the vehicle and the radar reflectors relative to each other must be precisely known. Thus, the method is comparatively simple to implement and therefore very versatile. In addition, effort and expense for the maintenance and calibration of the special measuring sections may be saved.

According to one preferred refinement, the first plurality of radar reflectors spaced apart from each other totals at least three. According to another preferred refinement, the second plurality of measuring points totals at least four. Three radar reflectors and four measuring points, for example, result in a ratio of unknown variables to measured values favorable for the calculation. Such a method may deliver satisfactory results with comparatively little effort.

According to another preferred refinement, the calculation of the second angles includes the steps of: approximating a trajectory of the radar sensor through the measuring positions on the virtual map; calculating tangents to the trajectory of the radar sensor as reference axes at each measuring position; calculating second angles between the tangents to the trajectory of the radar sensor and the radar reflector positions at each measuring position. In this way, reference axes may be ascertained which may approximate the vehicle longitudinal axis of the vehicle, without the need for additional sensors or external measurement data. Thus, the method places only minimal demands on vehicles and is therefore particularly versatile.

According to another preferred refinement, the method includes a step in which the misalignment is mechanically compensated for in accordance with the ascertained misalignment angle. According to another preferred refinement, the method includes a step in which the misalignment is compensated for in a control unit of the radar sensor in accordance with the ascertained misalignment angle. This may be advantageous if at present the driver does not wish or is unable to carry out a mechanical compensation of the misalignment angle.

According to another preferred refinement, the measurement of distances between each one of a third plurality of radar sensors and each one of the radar reflectors takes place at each measuring point. Thus, the method may require fewer radar reflectors and the ascertainment of the misalignment may be more precise. According to another preferred refinement, the misalignment angle is ascertained using an equally weighted averaging. In this way, the method may be simplified, if, for example, the reliability of all measurements is to be assessed equally. However, the measurements may also be weighted differently. For example, a measurement which is carried out during a strong lateral movement or when traveling over a distance having a steep incline may be weighted less in the averaging calculation. Alternatively, if multiple radar sensors, for example, are mounted on the vehicle which, for example, vary in accuracy as a function of a distance of the radar reflectors, the averaging may be weighted according to this accuracy. When averaging, for example, one first radar sensor having double the accuracy of one second radar sensor may be weighted twice as much.

According to another preferred refinement, the method is continually carried out based on randomly appearing targets while the vehicle is in a driving mode. For example, guide posts may function as such stationary targets. In this refinement, the function of the radar sensor may be permanently monitored. An ascertained misalignment angle may be compensated for by mathematical or mechanical compensation. If the misalignment angle exceeds a predetermined limiting value, a vehicle system may be prevented from making decisions based on the output of the radar sensor.

The aforementioned embodiments and refinements (where reasonable) may be arbitrarily combined with one another. Additional possible embodiments, refinements and implementations of the present invention also include not explicitly mentioned combinations of features according to the present invention described in conjunction with the exemplary embodiments previously or in the following. In particular, those skilled in the art will also add individual aspects as improvements or additions to the respective basic configuration of the present invention.

Figure 1:
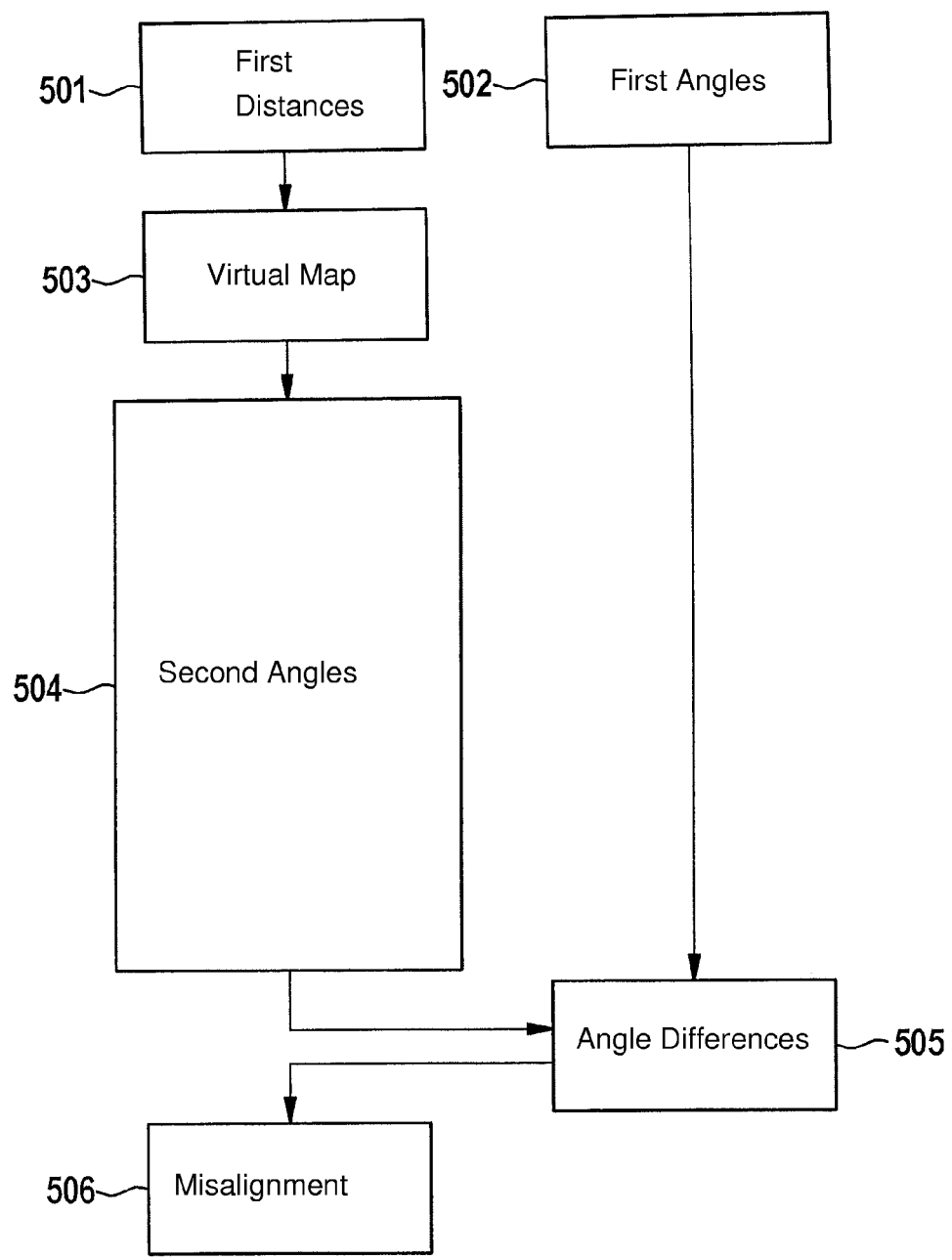
FIG. 1 shows a flow chart for explaining a method according to a first specific embodiment of the present invention.

In all figures, identical or functionally identical elements and devices, unless otherwise indicated, are provided with the same reference numerals. Although method steps are provided with reference numerals which include numbers, this does not establish an order; in particular, multiple method steps may occur simultaneously.

DETAILED DESCRIPTION

FIG. 1 shows a flow chart for explaining a method according to a first specific embodiment of the present invention. Here, reference is made to the reference numerals of FIG. 3, FIG. 4 and FIG. 5.

In one method step S01, distances 11, 13, 15 between radar sensor 2 and each individual radar reflector 12, 14, 16 of a first plurality of radar reflectors 12, 14, 16 spaced apart from each other are measured at each individual measuring point 22, 24, 26, 28 of a second plurality of measuring points 22, 24, 26, 28 spaced apart from each other. This means that at a first measuring point 22, distances 11, 13, 15 between radar sensor 2 and each individual radar reflector 12, 14, 16 are measured. At a second measuring point 24 which is spaced apart from first measuring point 22, distances 11, 13, 15 between radar sensor 2 and each individual radar reflector 12, 14, 16 are also measured. The same procedure is carried out at third measuring point 26 and fourth measuring point 28. Thus, in step S01 according to the first specific embodiment of the present invention a total of three distances 11, 13, 15 each are measured at four measuring points 22, 24, 26, 28, i.e., a total of twelve distances 11, 13, 15.

In a method step S02, first angles 42, 44, 46 between an axis 33 of radar sensor 2, along which a radar emission takes place, and radar reflectors 12, 14, 16 are measured at each measuring point 22, 24, 26, 28. This means that at first measuring point 22, three angles of first angles 42, 44, 46 between an axis 33 of radar sensor 2 and radar reflectors 12, 14, 16 are measured. At second measuring point 24 which is spaced apart from first measuring point 22, three additional angles of first angles 42, 44, 46 between axis 33 of radar sensor and radar reflectors 12, 14, 16 are measured. The same procedure is carried out at third measuring point 26 and fourth measuring point 28. Thus, each of three first angles 42, 44, 46 are measured at each of four measuring points 22, 24, 26, 28, i.e., a total of twelve angles.

In a method step S03, a virtual map 30 is created on the basis of measured distances 11, 13, 15. Virtual map 30 contains measuring positions 122, 124, 126, 128, each of which corresponds to positions of a measuring point 22, 24, 26, 28. Virtual map 30 also contains radar reflector positions 112, 114, 116, each of which corresponds to a position of a radar reflector 12, 14, 16. When creating virtual map 30, additional specifications and/or assumptions may be incorporated, as explained in greater detail below with reference to FIG. 5.

Calculated in a method step S04 at measuring positions 22, 24, 26, 28 are second angles 142, 144, 146 which are situated on virtual map 30 between radar reflector positions 112, 114, 116 and reference axes 32 defined on virtual map 30. Reference axes 32 traverse one of measuring positions 122, 124, 126, 128 respectively, and correspond essentially to vehicle longitudinal axis 35 of vehicle 1 as it was aligned at measuring point 22, 24, 26, 28, which corresponds to respective measuring position 122, 124, 126, 128.

In a method step S05, differences are calculated between angles of first angles 42, 44, 46 and angles of second angles 142, 144, 146 to which the former respectively correspond.

In a method step S06, a misalignment angle 99 of the misalignment is ascertained by a weighted averaging of the differences calculated in step S05.

Figure 2:
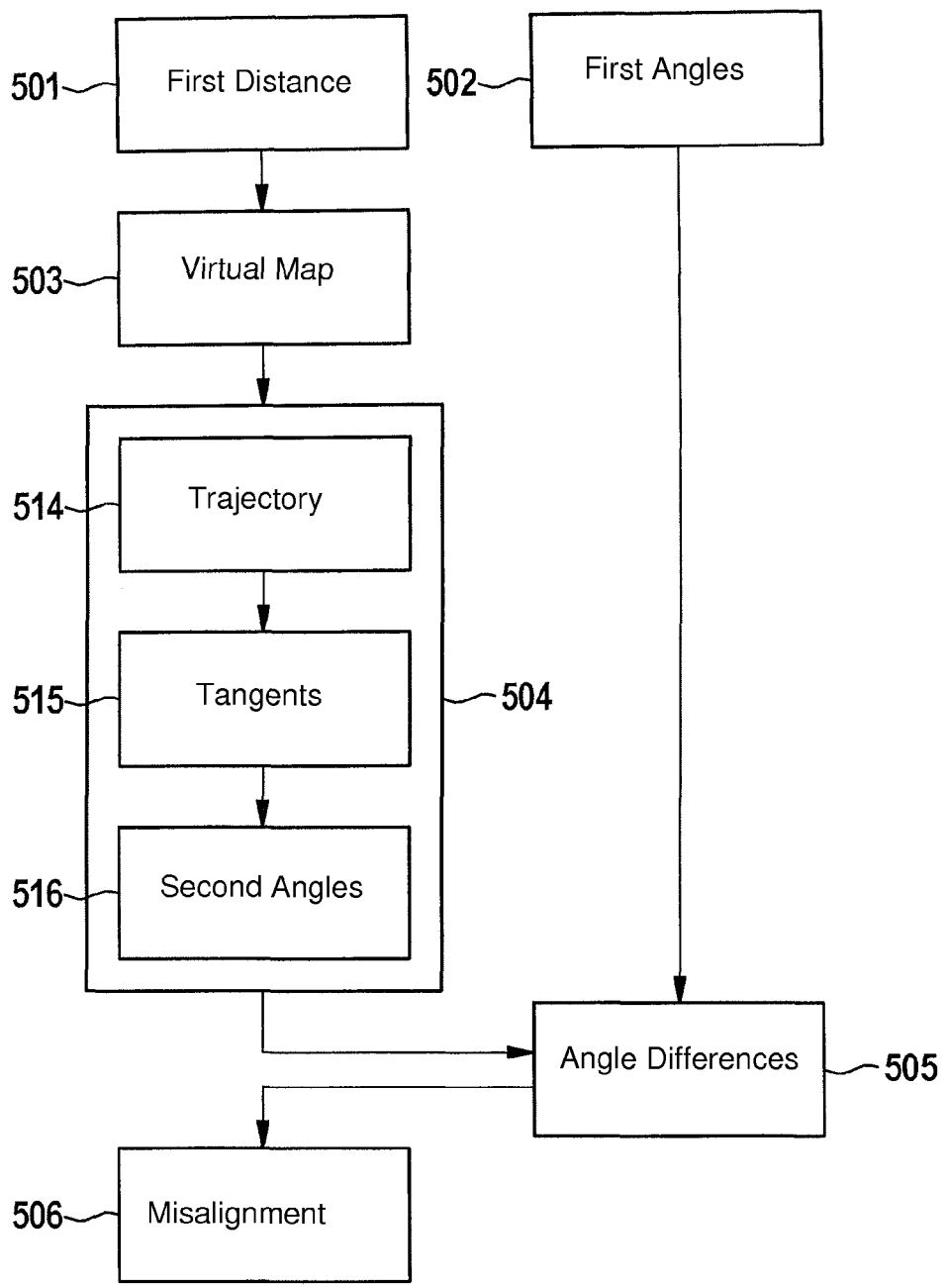
FIG. 2 shows a flow chart for explaining a method according to a second specific embodiment of the present invention.

FIG. 2 is a flow chart for explaining a method according to a second specific embodiment of the present invention.

Compared to the first specific embodiment described in connection with FIG. 1, FIG. 2 shows a more precise breakdown of step S04. According to the second specific embodiment, calculation S04 of second angles 142, 144, 146 includes the following additional steps: in a step S14 a trajectory 31 of the radar sensor is approximated on virtual map 30 through measuring positions 122, 124, 126 128. This means that trajectory 31 on virtual map 30 replicates the roadway through measuring positions 122, 124, 126, 128 on which radar sensor 2 of vehicle 1, more precisely an emission point 102 of radar radiation of radar sensor 2, has moved through actual measuring points 22, 24, 26, 28. The trajectory may be configured, for example, as a polynom or as a spline function in order to ensure a smooth course of trajectory 31 which preferably resembles the actual travel.

In a method step S15, tangents 32 to trajectory 31 of radar sensor 2 are calculated as reference axes 32 at each measuring position 122, 124, 126, 128 on virtual map 30. Tangents 32 to trajectory 31 approximate with great accuracy the direction in which vehicle 1, thus also radar sensor 2, has moved at the measuring point 22, 24, 26, 28 corresponding to measuring position 122, 124, 126, 128. In other words, tangents 32 approach trajectory 31 as vehicle longitudinal axis 35 of vehicle 1 was aligned to measuring points 22, 24, 26, 28.

In a method step S16, second angles 142, 144, 146, 148 between tangents 32 to trajectory 31 of radar sensor 2 and radar reflector positions 112, 114, 116 are calculated at each measuring position 122, 124, 126, 128. In other words, a tangent 32 and three angles of second angles 142, 144, 146 are calculated at each measuring position 122, 124, 126, 128, in each case tangent 32 being the first leg of second angles 142, 144, 146 and the apex in each case being a measuring position 122, 124, 126, 128. Thus, in method step S16 according to the second specific embodiment, a total of four tangents 32 and twelve second angles 142, 144, 146 are measured. Each of twelve measured second angles 142, 144, 146 corresponds exactly to one of measured twelve first angles 42, 44, 46.

Figure 3:
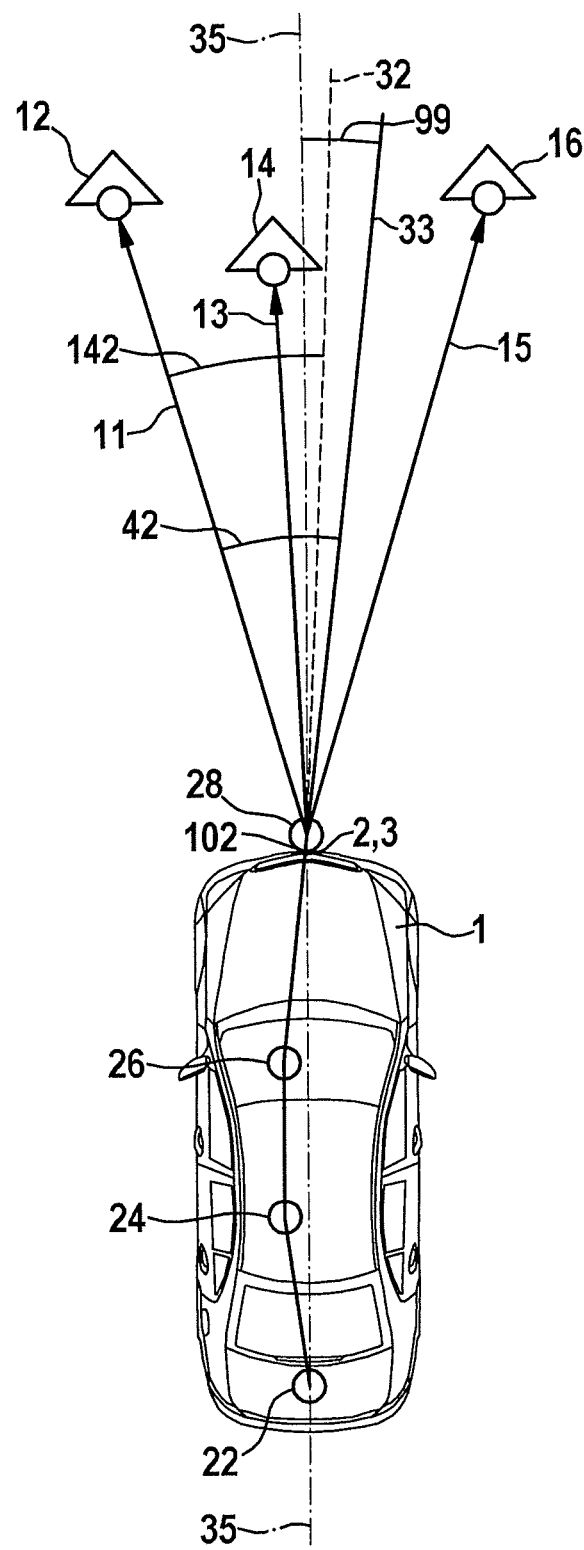
FIG. 3 schematically shows a top view of a vehicle for explaining the method according to the second specific embodiment of the present invention.

FIG. 3 schematically shows a top view of a vehicle 1 for explaining the method according to the second specific embodiment of the present invention.

FIG. 3 shows a vehicle 1 including a radar sensor 2 situated at front 3 of the vehicle. Vehicle 1 is in driving mode, front 3 of vehicle 1 having already traveled through one first, one second and one third measuring point 22, 24, 26. At the point in time represented in FIG. 3, front 3 of vehicle 1 is at fourth measuring point 28. In the setpoint state, axis 33, along which a radar emission takes place, is situated exactly on vehicle longitudinal axis 35 of vehicle 1. The deviation of axis 33 from vehicle longitudinal axis 35 is described by misalignment angle 99.

According to the second specific embodiment, radar reflectors 12, 14, 16 are placed in roughly predetermined, spaced apart positions in a plane. Measuring points 22, 24, 26, 28 are not known beforehand. They result from the driver's manner of driving and from the points in time at which measurements are carried out. It may be predetermined, for example, that measurements are carried out at regular intervals. Measuring points 22, 24, 26, 28 may then result from speeds selected by the driver and alignments of vehicle 1 over a period of time in which measurements are carried out. Thus, for example, it is not necessary for vehicle 1 to drive a predefined path as precisely as possible.

Vehicle 1 travels essentially toward radar reflectors 12, 14, 16, distance and angle measurements being carried out. As at previous measuring points 22, 24, 26, first angles 42, 44 46 and distances 11, 13, 15 between radar sensor 2 and each radar reflector 12, 14, 16 are also measured at measuring point 28. For the sake of clarity, only angle 42 of first angles 42, 44, 46 is plotted in FIG. 3. The apex of angle 42 is measuring point 28, at which radar sensor 2 is situated. More precisely, emission point 102 of radar sensor 2 is situated at measuring point 28. The first leg of angle 42 is axis 33; the second leg of angle 42 is the distance between measuring point 28 and the first radar reflector. Also calculated according to the present invention is one of second angles 142 which corresponds to one of first angles 42.

Also plotted in FIG. 3 is a reference axis 32 which is defined on virtual map 30 at measuring position 128 corresponding to measuring point 28. In FIG. 3 the difference between vehicle longitudinal axis 35 and reference axis 32 is shown greatly enlarged. According to the second specific embodiment, reference axis 32 is calculated as tangent 32 to trajectory 31 of radar sensor 2, more precisely, to trajectory 31 of emission point 102 of radar sensor 2. Given a correspondingly accurate approximation S15 of trajectory 31, vehicle longitudinal axis 35 and reference axis 32 are nearly congruent. Also plotted in FIG. 3 is an angle 142 of second angles 142, 144, 146 which is enclosed between reference axis 32 and the distance between measuring position 128 and radar reflection position 112. Radar reflection position 112 on virtual map 30 corresponds to the actual position of radar reflector 12, as explained in greater detail below with reference to FIG. 5.

Figure 4:
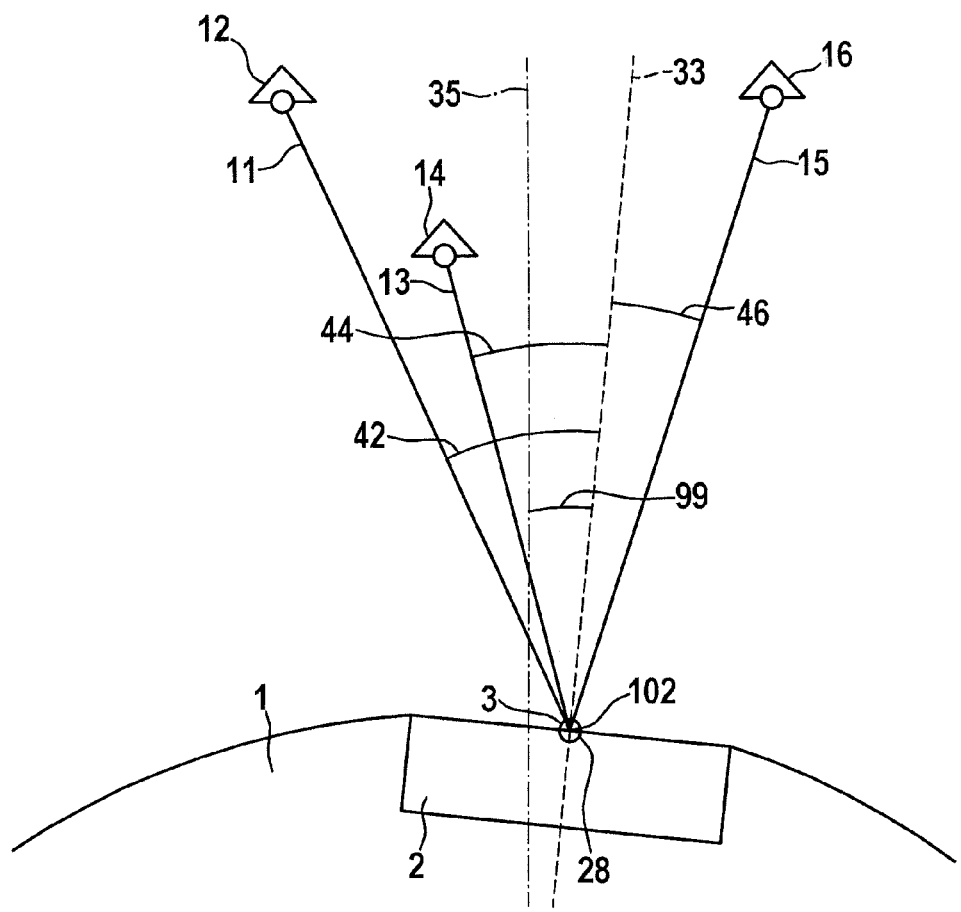
FIG. 4 schematically shows a top view of a radar sensor and radar reflectors for explaining the method according to the second specific embodiment of the present invention.

FIG. 4 schematically shows a top view of a radar sensor 2 and radar reflectors 12, 14, 16 for explaining the method according to the second specific embodiment of the present invention.

FIG. 4 schematically shows that radar sensor 2 has shifted relative to its setpoint position, i.e., a misalignment has occurred and axis 33 of radar sensor 2, along which a radar emission takes place, differs by misalignment angle 99 of vehicle longitudinal axis 35 of vehicle 1.

Axis 33 traverses emission point 102 which is situated at the front side of radar sensor 3 aligned essentially in the travel direction. In other words, axis 33 in the setpoint position, in terms of horizontal alignment, is situated precisely in the forward direction of vehicle 1 when traveling straight ahead. Emission point 102 may be a point from which radar radiation is emitted. However, emission point 102 may also be, for example, the midpoint of an emitting disk or the midpoint of a symmetrical arrangement of radar beams. According to the second specific embodiment, each of first angles 42, 44, 46 are measured with emission point 102 as the apex which is situated at measuring point 28.

Angle 42 is enclosed by axis 33 and the distance between emission point 102 or measuring point 28 and radar reflector 12. Angle 44 is enclosed between reference axis 33 and the distance between emission point 102 or measuring point 28 and radar reflector 14. Angle 46 is enclosed between reference axis 33 and the distance between emission point 102 or measuring point 28 and radar reflector 16. Here, the angle measurements are signed, axis 33 consistently representing the first leg. Thus, in FIG. 4, angles 42, 44 are measured with a positive sign and angle 46 with a negative sign.

Distances 11, 13, 15 are also measured in relation to emission point 102 or measuring point 28, at which emission point 102 is situated at the time of measurement. Distance 11 is the distance between measuring position 122 and radar reflector 12, distance 13 is the distance between measuring position 122 and radar reflector 14, distance 15 is the distance between measuring point 122 and radar reflector 16.

Figure 5:
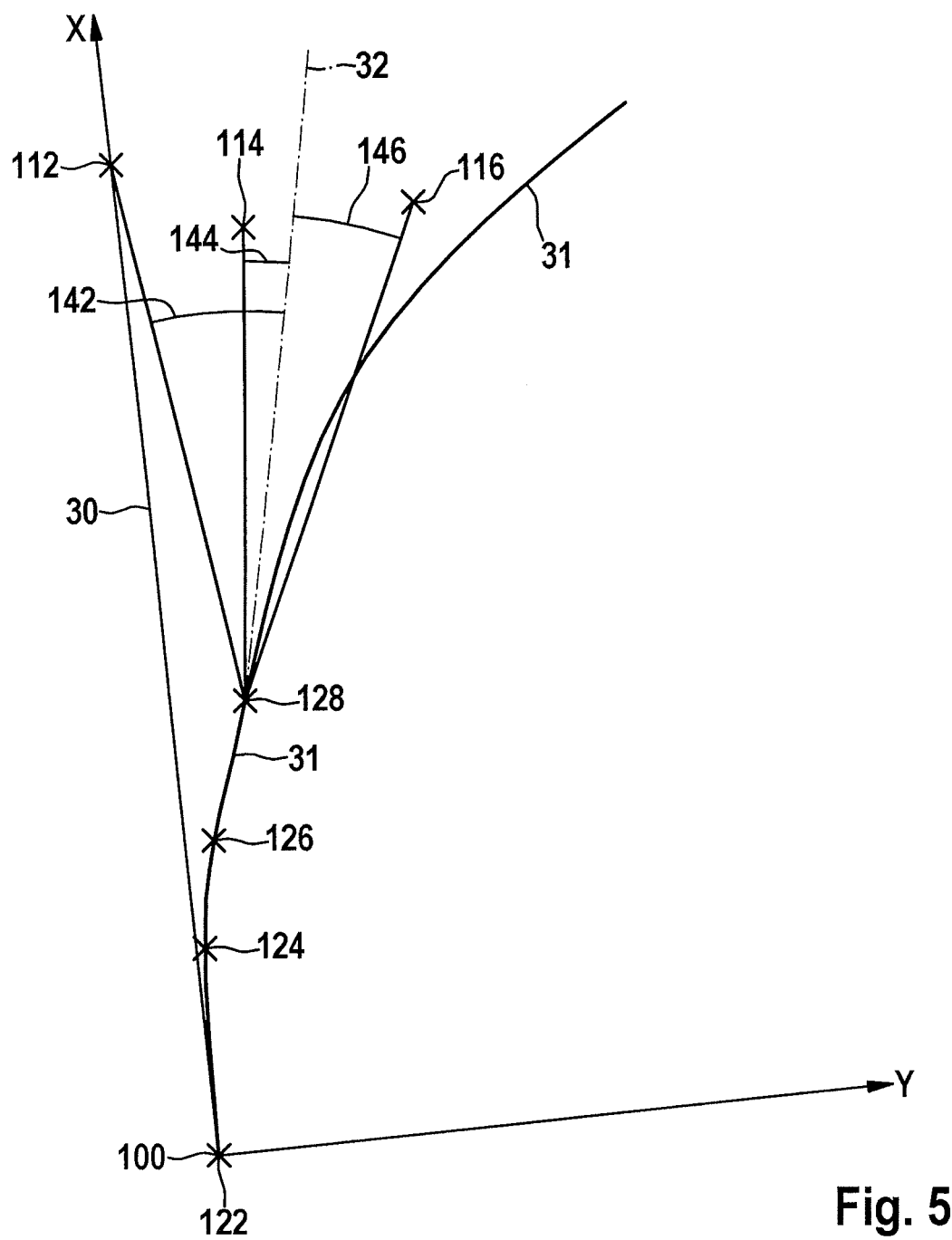
FIG. 5 shows a schematic view of a virtual map for explaining the method according to the second specific embodiment of the present invention.

FIG. 5 is a schematic view of a virtual map 30 for explaining the method according to the second specific embodiment of the present invention.

Measuring position 122 corresponds to the actual position of measuring point 22. Measuring position 124 corresponds to the actual position of measuring point 24. Measuring position 126 corresponds to the actual position of measuring point 26. Measuring position 128 corresponds to the actual position of measuring point 28. Radar reflector position 112 corresponds to the actual position of radar reflector 12, radar reflector position 114 corresponds to the actual position of radar reflector 14, and radar reflector position 116 corresponds to the actual position of radar reflector 16.

According to the second specific embodiment, three distances 11, 13, 15 each were measured at four measuring points, i.e., a total of twelve distances. Creating virtual map 30 including three radar reflector positions 112, 14, 116 and four measuring positions 122, 124, 126, 128, i.e., seven points each including two coordinates, requires fourteen equations. Since only twelve equations may be formed based on the twelve measured distances 11, 13, 15, two additional equations are determined according to the second specific embodiment.

Without loss of generality, first measuring position 122 is assigned the X-coordinate 0 and the Y-coordinate 0. This determines the source 100 of the map. In addition, the Y-coordinate of radar reflector position 112 may be set to 0, for example, and it may be determined that the X-coordinate of radar reflector position 112 is to be greater than 0. This also establishes the orientation of virtual map 30. Thus, 14−3=11 coordinates remain to be determined, for which twelve additional distance measurements are available. If more than three radar reflectors 12, 14, 16 and/or more than four measuring points 22, 24, 26, 28 are used, the number of measurements increases further and consistently surpasses the number of coordinates sought. In order to calculate the coordinates sought as accurately as possible, the approach may be determined by using the least squares method. In this case, the so-called sum of error squares is minimized, which is given as $$E = \sum_{i=1}^{N_S} \sum_{j=1}^{N_T} \left( \sqrt{(S_{i,x} - T_{j,x})^2 + (S_{i,y} - T_{j,y})^2} - d_{i,j} \right)^2.$$

In this equation, $S_{i,x}$ denotes the X-coordinate and $S_{i,y}$ denotes the Y-coordinate of measuring position $S_i$, and $T_{j,x}$ denotes the X-coordinate and $T_{j,y}$ the Y-coordinate of radar reflector position $T_j$. Measured distance 11, 13, 15 between measuring point 22, 24, 26 28, which corresponds to measuring position $S_i$, and radar reflector 12, 14, 16, which corresponds to radar reflector position $T_j$, is denoted by $d_{i,j}$. $N_T$ is the number of radar reflectors 12, 14, 16 and $N_S$ is the number of measuring points. Known approach methods may be applied to determine the unknown coordinates. It may start, for example, with an initial approach based on random numbers, after which an iterative minimization of the sum of error squares is carried out. Typical suitable methods for minimizing the sum of error squares are, for example, the gradient method, the Gauss-Newton method or multi-dimensional Newton methods.

Based on the measuring positions 122, 124, 126, 128 a so-called trajectory 31 is calculated, along which emission point 102 of radar sensor 2 has moved. The trajectory may be configured, for example, as a polynom or as a spline function in order to ensure a smooth course of trajectory 31 which preferably resembles the actual travel.

Once trajectory 31 is determined, a tangent 32 to trajectory 31 may be calculated at each measuring position 122, 124, 126, 128. Such a tangent 32 at measuring position 128 is plotted in FIG. 5. Using tangent 32 as a reference axis 32, second angles 142, 144, 146 may be calculated. Since tangent 32 at measuring position 128 to trajectory 31 corresponds essentially to the alignment of vehicle longitudinal axis 35 of vehicle 2 at measuring point 28, and radar reflector position 112 corresponds essentially to the actual position of radar reflector 12, calculated angle 142 corresponds to a setpoint value for measured first angle 42. Angle 142 is enclosed between tangent 32 at measuring position 128 to trajectory 31 and the distance between measuring position 128 and radar reflector position 112. Second angle 144 is enclosed between tangent 32 at measuring position 128 to tangent 31 and the distance between measuring position 128 and radar reflector position 114. Thus, second angle 144 corresponds to measured first angle 44, or corresponds to a setpoint value for first measured angle 44. Second angle 146 is enclosed between tangent 32 at measuring point 128 to trajectory 31 and the distance between measuring point 128 and radar reflector position 116. Second angle 146 corresponds to measured first angle 46 or corresponds to a setpoint value for measured first angle 46. By analogy with the measurement of first angles 42, 44, 46, the calculations of second angle 142, 144, 146 are also signed, each tangent 32 to respective measuring position 122, 124, 126, 128 representing in each case the first leg of each angle.

In method step S05, the differences in each case are formed between one of first angles 42, 44, 46 and the respective corresponding angle of second angles 142, 144, 146. This means that differences are formed in each case between a measured first angle 42, 44, 46 and its respective corresponding calculated setpoint value.

From the calculated differences a misalignment angle 99 of the misalignment of radar sensor 2 is ascertained in method step S06 by a weighted averaging of the calculated differences. According to the second specific embodiment, the weighted averaging is carried out by an equally weighted averaging, i.e., each difference is incorporated with the same weight of, for example, one. Alternatively, certain differences of a higher weight may be incorporated in the weighted average, for example, if one of radar reflectors 12, 14, 16 is situated particularly close to radar sensor 2 or may for other reasons enable particularly accurate measurements.

By averaging via many calculated angle differences, the calculation of misalignment angle 99 becomes more precise and the effects of a random measurement noise is minimized.

Figure 6:
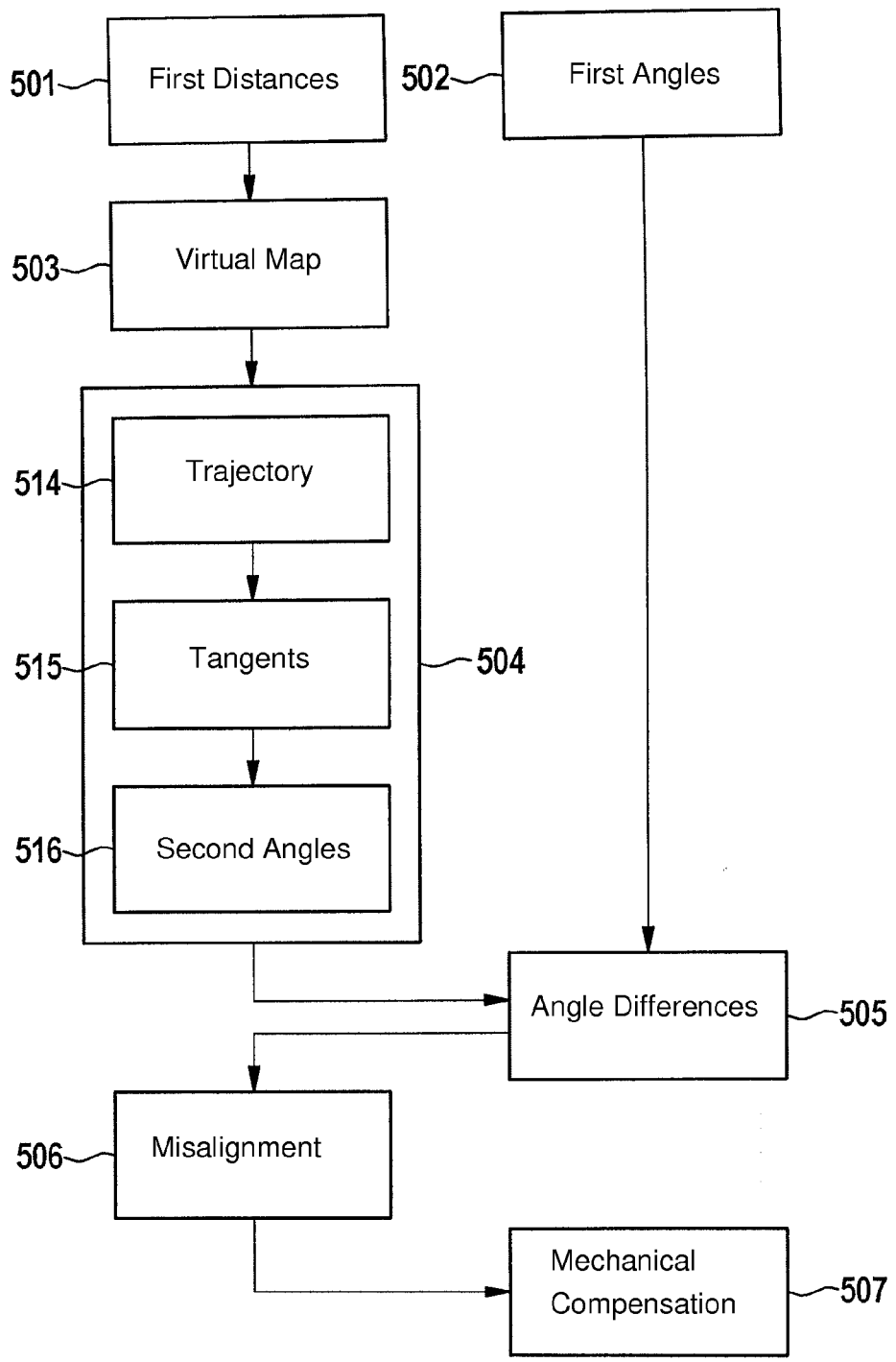
FIG. 6 shows a flow chart for explaining a method according to a third specific embodiment of the present invention.

FIG. 6 shows a flow chart for explaining a method according to a third specific embodiment of the present invention.

The method according to the third specific embodiment corresponds essentially to the method according to the second specific embodiment. It also includes one additional step S07, in which a mechanical compensation S07 of the misalignment is carried out in accordance with ascertained misalignment angle 99. Such a mechanical compensation S07 may include, for example, a manual realignment of radar sensor 2, in which axis 33 along which a radar emission takes place, of radar 2 is aligned with vehicle longitudinal axis 35 of vehicle 1 by tilting radar sensor 2 by misalignment angle 99. Such a mechanical compensation 50 may, however, also include replacing a component of vehicle 1 which contains radar sensor 2. Such a component may, for example, be the bumper of vehicle 1. However, the mechanical compensation S07 of the misalignment may also take place automatically, for example, using actuators mounted on radar sensor 2, which are designed in such a way that they are able to pivot radar sensor 2.

Figure 7:
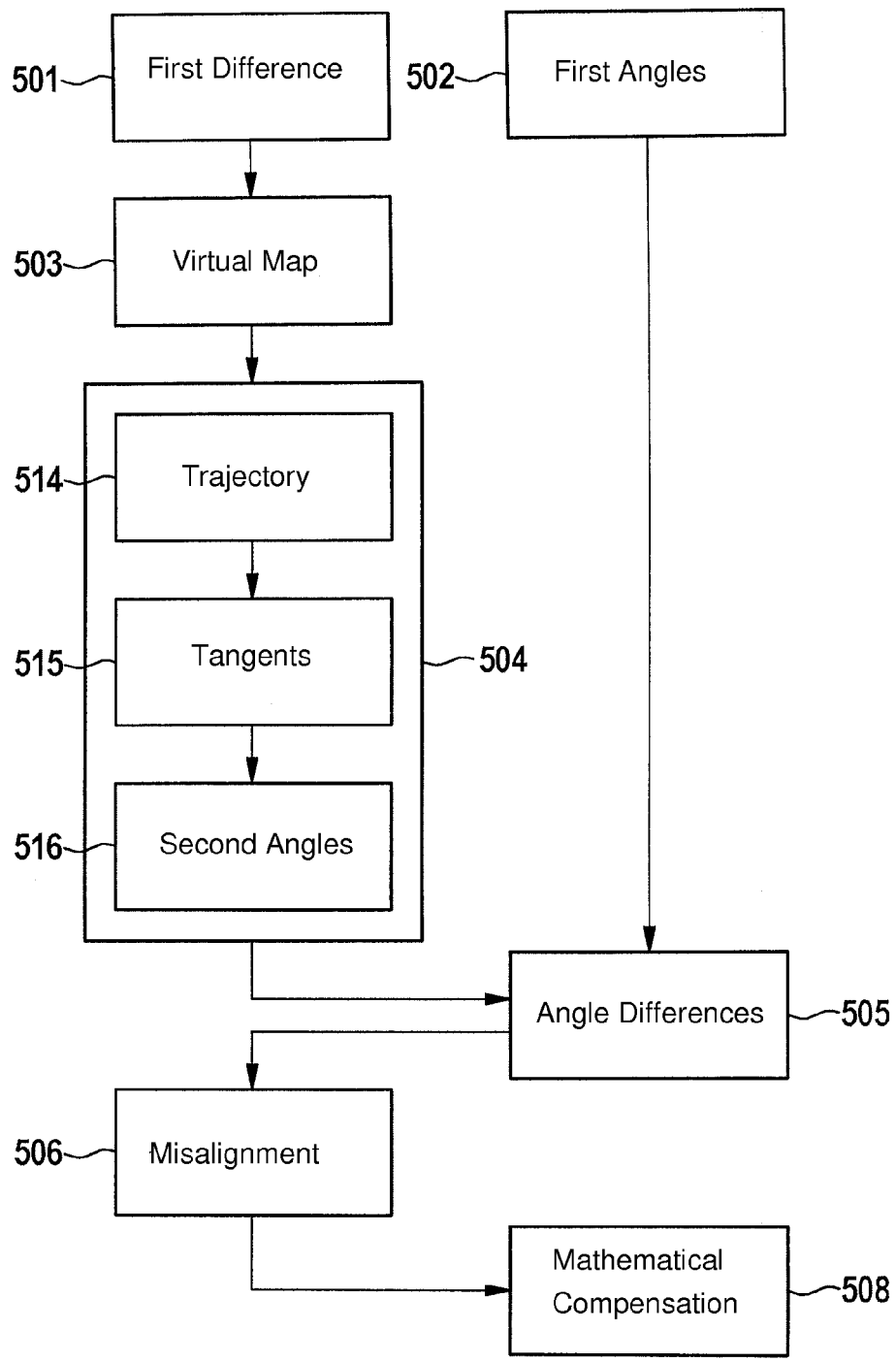
FIG. 7 shows a flow chart for explaining a method according to a fourth specific embodiment of the present invention.

FIG. 7 shows a flow chart for explaining a method according to a fourth specific embodiment of the present invention.

The method according to the fourth specific embodiment of the present invention includes essentially the same steps as the method according to the second specific embodiment of the present invention. The method according to the fourth specific embodiment includes an additional step S08, in which the misalignment is mathematically compensated for S08 in a control unit of radar sensor 2 in accordance with ascertained misalignment angle 99. Ascertained misalignment angle 99 may therefore be taken into consideration in the further processing of information generated by radar sensor 2. In the case of a minor misalignment, i.e., small misalignment angles 99, such a mathematical compensation S08 may render a mechanical correction S07 of the misalignment unnecessary. A mathematical compensation S08 of the misalignment may also be carried out in the driving mode of vehicle 1 when the adaptive cruise control (ACC) is in operation, in which randomly appearing stationary targets may be used as radar reflectors 12, 14, 16. Such targets may be guide posts, for example.

Although the application has been described herein with reference to preferred exemplary embodiments, it is by no means limited to these, but rather may be modified in a variety of ways.

For example, instead of one single radar sensor 2, it is also possible to use a third plurality of radar sensors 2, the distances 11, 13, 15 between each individual radar sensor of the third plurality of radar sensors 2 and each individual radar reflector of radar reflectors 12, 14, 16 being measured at each measuring point 22, 24, 26, 28. Reference axes 32 on virtual map 30 may also be defined using additionally provided data instead of with the aid of tangents 32 at approximated trajectories 31. For example, acceleration sensors of vehicle 1 may be used to provide information about the alignment of vehicle longitudinal axis 35 of vehicle 1 at measuring points 22, 24, 26, 28 for virtual map 30. Corresponding information already available, for example, from position and/or navigation systems may also be used. Instead of one single misalignment angle 99, it is also possible to ascertain multiple misalignment angles 99 relative to multiple radar sensors 2 or relative to the misalignment of a radar sensor 2 in multiple dimensions.

What is claimed is:

1. A method for ascertaining a misalignment of a radar sensor of a vehicle, comprising:
    measuring distances between the radar sensor and each individual radar reflector of a first plurality of radar reflectors spaced apart from each other at each individual measuring point of a second plurality of measuring points spaced apart from each other;
    measuring first angles between an axis of the radar sensor along which a radar emission takes place, and the radar reflectors at each measuring point;
    creating a virtual map on the basis of the measured distances including measuring positions that correspond to positions of the measuring points and radar reflector positions that correspond to positions of the radar reflectors;
    calculating at the measuring positions second angles between the radar reflector positions and reference axes defined on the virtual map which correspond to a vehicle longitudinal axis of the vehicle;
    calculating differences between angles of the first angles and angles of the second angles respectively; and
    ascertaining a misalignment angle of the misalignment using a weighted averaging of the calculated differences.

2. The method as recited in claim 1, wherein the first plurality of radar reflectors spaced apart from each other totals at least three.

3. The method as recited in claim 1, wherein the second plurality of measuring points totals at least four.

4. The method as recited in claim 1, wherein the calculation of the second angles includes the steps of:
    approximating a trajectory of the radar sensor through the measuring positions on the virtual map;
    calculating tangents to the trajectory of the radar sensor as the reference axes at each measuring position; and
    calculating second angles between the tangents to the trajectory of the radar sensor and the radar reflector positions at each measuring position.

5. The method as recited in claim 1, further comprising:
    mechanically compensating for the misalignment in accordance with the ascertained misalignment angle.

6. The method as recited in claim 1, further comprising:
    mathematically compensating for the misalignment in accordance with the ascertained misalignment angle in a control unit of the radar sensor.

7. The method as recited in claim 1, wherein distances between each individual radar sensor of a third plurality of radar sensors and each individual radar reflector of radar reflectors are measured at each measuring point.

8. The method as recited in claim 1, wherein the misalignment angle is ascertained using an equally weighted averaging.

9. The method as recited in claim 1, wherein the method is continually carried out based on randomly appearing stationary targets, while the vehicle is in a driving mode, and an ascertained misalignment angle is compensated for by one of mathematical and mechanical compensation.

10. A device for ascertaining a misalignment of a radar sensor of a vehicle, comprising:
    a radar sensor for:
        measuring distances between the radar sensor and a first plurality of radar reflectors spaced apart from each other at each individual measuring point of a second plurality of measuring points spaced apart from each other; and
        measuring first angles between an axis of the radar sensor, along which a radar emission takes place, and the radar reflectors at each individual measuring point; and
    a processor unit for:
        creating a virtual map on the basis of the measured distances, which includes measuring positions which correspond to positions of the measuring points, and radar reflector positions which correspond to positions of the radar reflectors;
        calculating second angles from the virtual map between the radar reflector positions and reference axes defined on the virtual map which correspond to a vehicle longitudinal axis of the vehicle at the measuring positions;
        calculating differences between angles of the first angles and angles of the second angles to which the former respectively correspond; and
        ascertaining a misalignment angle of the misalignment using a weighted averaging of the calculated differences.

\* \* \* \* \*